United States Patent
Shen

(10) Patent No.: US 10,432,042 B2
(45) Date of Patent: Oct. 1, 2019

(54) STATOR STRUCTURE

(71) Applicant: ASIA VITAL COMPONENTS CO., LTD., New Taipei (TW)

(72) Inventor: Meng Shen, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 132 days.

(21) Appl. No.: 15/653,532

(22) Filed: Jul. 19, 2017

(65) Prior Publication Data

US 2019/0027978 A1  Jan. 24, 2019

(51) Int. Cl.
*H02K 5/16* (2006.01)
*H02K 1/18* (2006.01)

(52) U.S. Cl.
CPC .................... *H02K 1/187* (2013.01)

(58) Field of Classification Search
CPC .............................. H02K 1/187; H02K 5/1675
USPC .......................... 310/90, 43, 62, 91; 384/100
See application file for complete search history.

(56) References Cited

U.S. PATENT DOCUMENTS

| 5,610,462 A * | 3/1997 | Takahashi | H02K 5/1675 310/90 |
| 8,207,643 B2 * | 6/2012 | Horng | H02K 5/1675 310/67 R |
| 2005/0046286 A1 * | 3/2005 | Horng | H02K 1/187 310/67 R |
| 2009/0069204 A1 * | 3/2009 | Kamimura | C10M 169/04 508/100 |
| 2010/0272586 A1 * | 10/2010 | Hsu | F04D 29/063 417/354 |

* cited by examiner

*Primary Examiner* — Hanh N Nguyen
(74) *Attorney, Agent, or Firm* — Jackson IPG PLLC; Demian K. Jackson

(57) ABSTRACT

A stator structure includes a bearing cup disposed on a base seat, a bearing, a silicon steel sheet assembly and a press member. The bearing cup has a receiving space in which the bearing is received. One end of the bearing is formed with an extension section outward extending from the bearing. The silicon steel sheet assembly is fitted around the bearing cup and has an upper end face and a lower end face. The press member is correspondingly assembled and disposed on a top end of the bearing cup. The press member has a first press section and a second press section protruding from one face of the press member. The first press section correspondingly presses the extension section of the bearing. The second press section correspondingly presses the upper end face of the silicon steel sheet assembly.

8 Claims, 5 Drawing Sheets

STATOR STRUCTURE

BACKGROUND OF THE INVENTION

1. Field of the Invention

The present invention relates generally to a stator structure, and more particularly to a stator structure, which is able to greatly enhance the concentricity of the silicon steel sheet assembly and the bearing and greatly increase the precision of the assembling positions of the silicon steel sheet assembly and the bearing. In addition, during the assembling process, the silicon steel sheet assembly and the bearing of the stator structure are prevented from being deformed.

2. Description of the Related Art

It is known that various electronic information products (such as computers) have been more and more popularly used and widely applied in various fields. The demands lead to rapid development of the electronic information industries and technologies. Therefore, in the electronic information industries, there is a trend to enhance the execution/operation speed and increase access capacity. As a result, in high-speed operation, the components in the electronic information products often generate high heat to cause rise of temperature.

With a computer host taken as an example, the heat generated by the central processing unit (CPU) in the computer host is the greatest part of the heat generated by the computer host. The rise of the temperature of the CPU will lead to deterioration the execution performance. Moreover, in case that the temperature of the CPU rises to exceed a tolerable limit, the computer may crash or even burn down. In addition, in order to solve the problem of electromagnetic radiation, the computer host is generally enclosed in a computer case. As a result, the heat generated by the CPU and the other generation components can be hardly quickly dissipated. Therefore, it has become a critical issue how to quickly dissipate the heat generated by the CPU and the other generation components.

In general, a heat sink and a cooling fan are arranged on the CPU to dissipate the heat generated by the CPU. Multiple radiating fins are disposed on one side of the heat sink. The surface of the other side of the heat sink (free from any radiating fin) is in direct contact with the CPU, whereby the heat generated by the CPU can be conducted to the radiating fins and quickly dissipated by way of radiation and by means of the cooperative cooling fan, which drives airflow to forcedly dissipate the heat.

As shown in FIG. 1, the conventional cooling fan 1 has a base seat 10. A hollow bearing cup 11 is disposed on the base seat 10 and protrudes therefrom. A bearing 12 is disposed in the bearing cup 11. The bearing 12 and the bearing cup 11 are tightly connected with each other by means of a copper ring 13, which is tightened between the bearing 12 and the bearing cup 11 by means of press fit to enhance the tightness between the bearing 12 and the bearing cup 11. In addition, a silicon steel sheet assembly 14 is disposed around the bearing cup 11. The silicon steel sheet assembly 14 is press-fitted around the bearing cup 11 by means of radial interference to enhance the tightness between the bearing cup 11 and the silicon steel sheet assembly 14. Therefore, in operation, the concentricity of the silicon steel sheet assembly 14 and the bearing 12 can be hardly controlled. Furthermore, during the assembling process, the precision of the assembling positions of the silicon steel sheet assembly 14 and the bearing 12 are lower. Also, the silicon steel sheet assembly 14 and the bearing cup 11 are assembled by means of radial interference. As a result, during the assembling process, the silicon steel sheet assembly 14 and the bearing 12 are apt to deform.

According to the above, the conventional cooling fan has the following shortcomings:

1. It is hard to control the concentricity of the silicon steel sheet assembly and the bearing.
2. The precision of the assembling positions of the silicon steel sheet assembly and the bearing are low.
3. During the assembling process, the silicon steel sheet assembly and the bearing are apt to deform.

It is therefore tried by the applicant to provide a stator structure to eliminate the shortcomings of the conventional cooling fan.

SUMMARY OF THE INVENTION

It is therefore a primary object of the present invention to provide a stator structure, which is able to greatly enhance the concentricity of the silicon steel sheet assembly and the bearing.

It is a further object of the present invention to provide the above stator structure, which is able to greatly increase the precision of the assembling positions of the silicon steel sheet assembly and the bearing.

It is still a further object of the present invention to provide the above stator structure, which eliminates the problem of the conventional stator structure that the silicon steel sheet assembly and the bearing cup are assembled by means of radial interference so that the silicon steel sheet assembly and the bearing are apt to deform.

It is still a further object of the present invention to provide the above stator structure, in which during the assembling process, the bearing is prevented from being deformed.

To achieve the above and other objects, the stator structure of the present invention includes a bearing cup, a bearing, a silicon steel sheet assembly and a press member. The bearing cup is disposed on a base seat and has a receiving space in which the bearing is received. One end of the bearing is formed with an extension section outward extending from the bearing. The silicon steel sheet assembly is fitted around the bearing cup and has an upper end face and a lower end face. The press member is correspondingly assembled and disposed on a top end of the bearing cup. The press member has a first press section and a second press section protruding from one face of the press member. The first press section correspondingly presses the extension section of the bearing. The second press section correspondingly presses the upper end face of the silicon steel sheet assembly.

According to the structural design of the stator structure, the first press section of the press member correspondingly presses the extension section of the bearing and the second press section correspondingly presses the upper end face of the silicon steel sheet assembly. In other words, the press member is able to press and secure both the bearing and the silicon steel sheet assembly. In this case, when the motor operates, the concentricity of the silicon steel sheet assembly and the bearing can be greatly enhanced. In addition, during the assembling process, the precision of the assembling positions of the silicon steel sheet assembly and the bearing are greatly increased.

Also, the stator structure of the present invention eliminates the problem of the conventional stator structure that the silicon steel sheet assembly and the bearing cup are assembled by means of radial interference so that during the assembling process, the silicon steel sheet assembly and the bearing are apt to deform due to compression. Furthermore, the press member presses the extension section of the bearing so as to secure the bearing. That is, the main body of the bearing will not directly bear the axial pressure so that the damage ratio of the bearing is greatly lowered.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
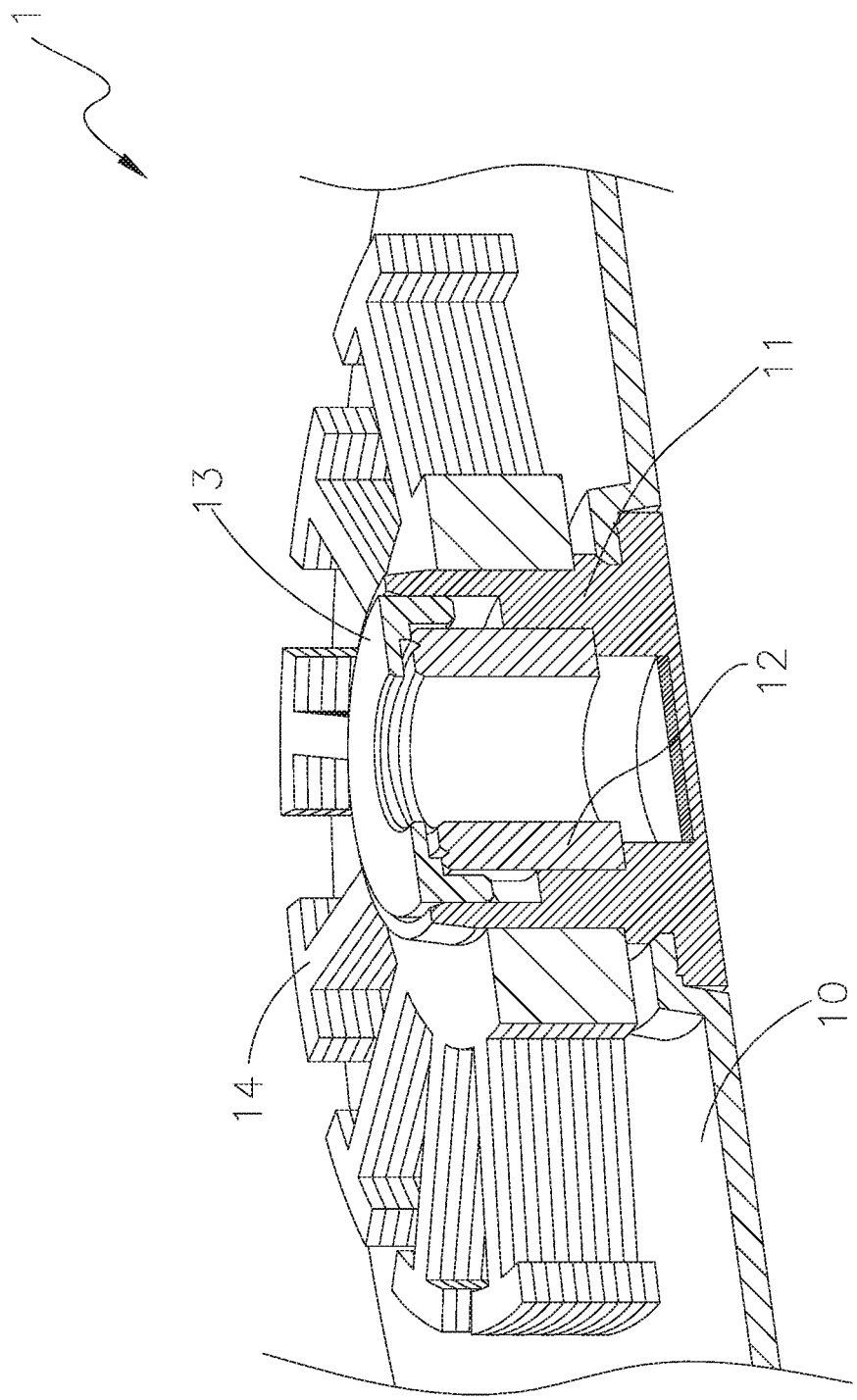
FIG. 1 is a perspective sectional view of a conventional stator structure.
Figure 2A:
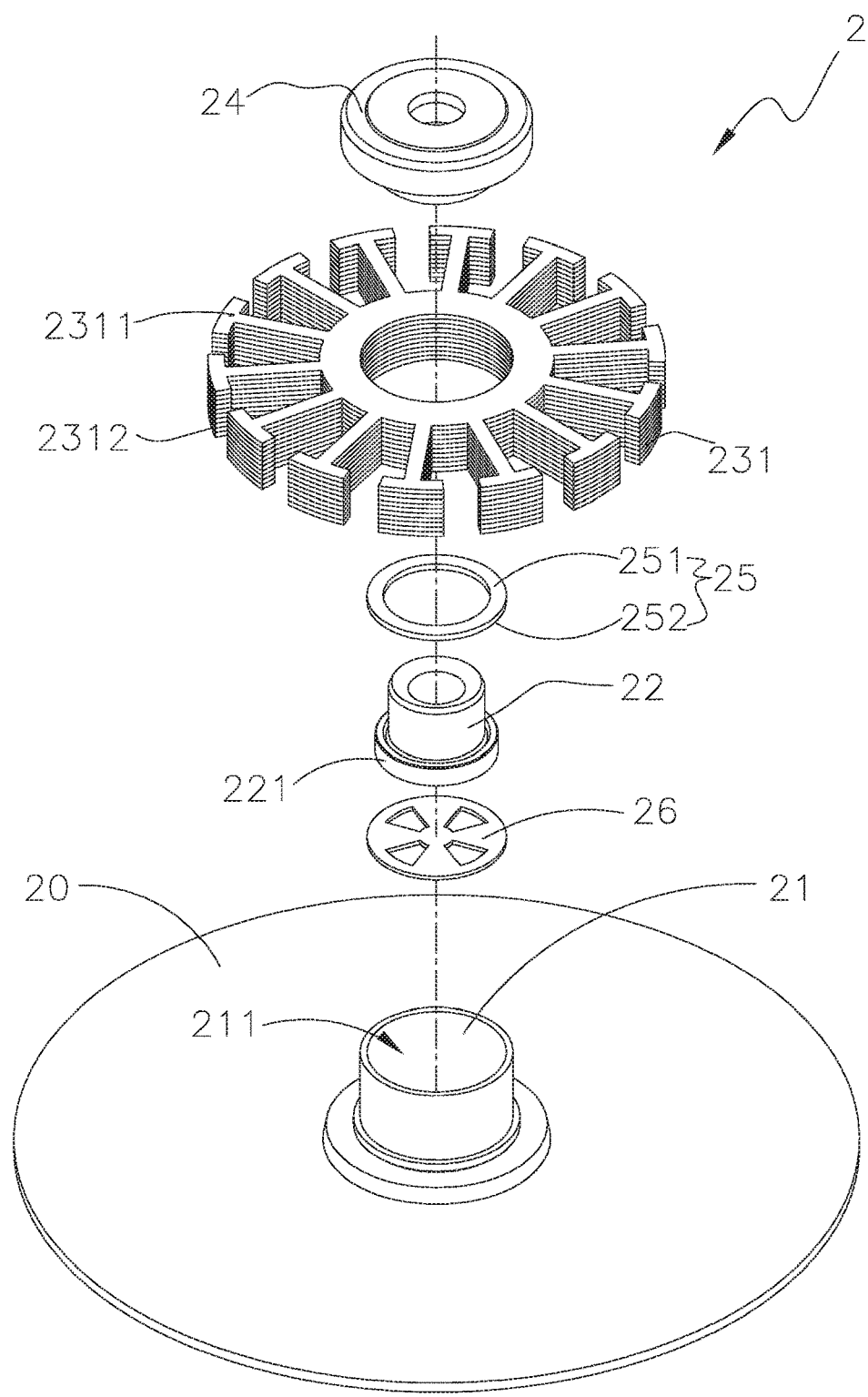
FIG. 2A is a perspective exploded view of a first embodiment of the stator structure of the present invention.
Figure 2B:
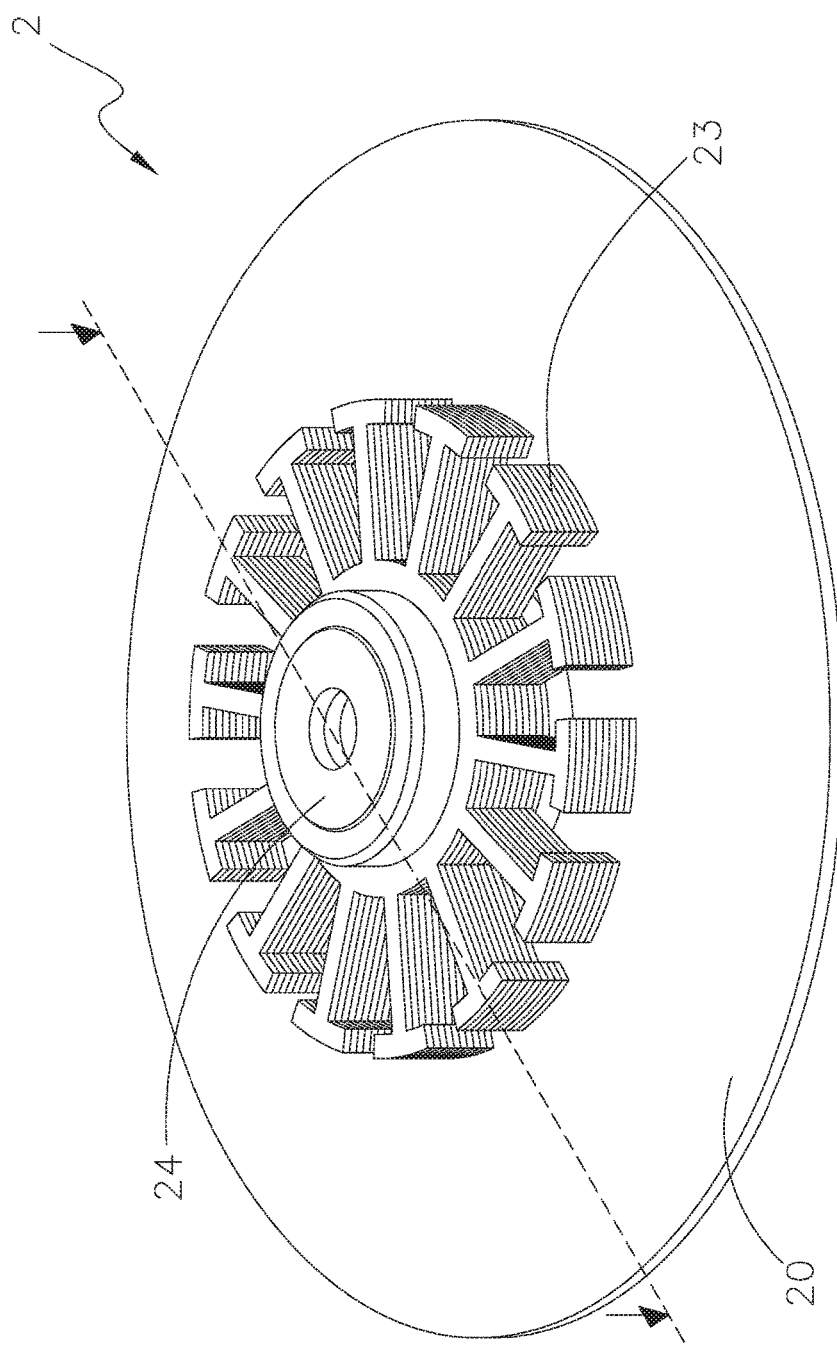
FIG. 2B is a perspective assembled view of the first embodiment of the stator structure of the present invention.
Figure 2C:
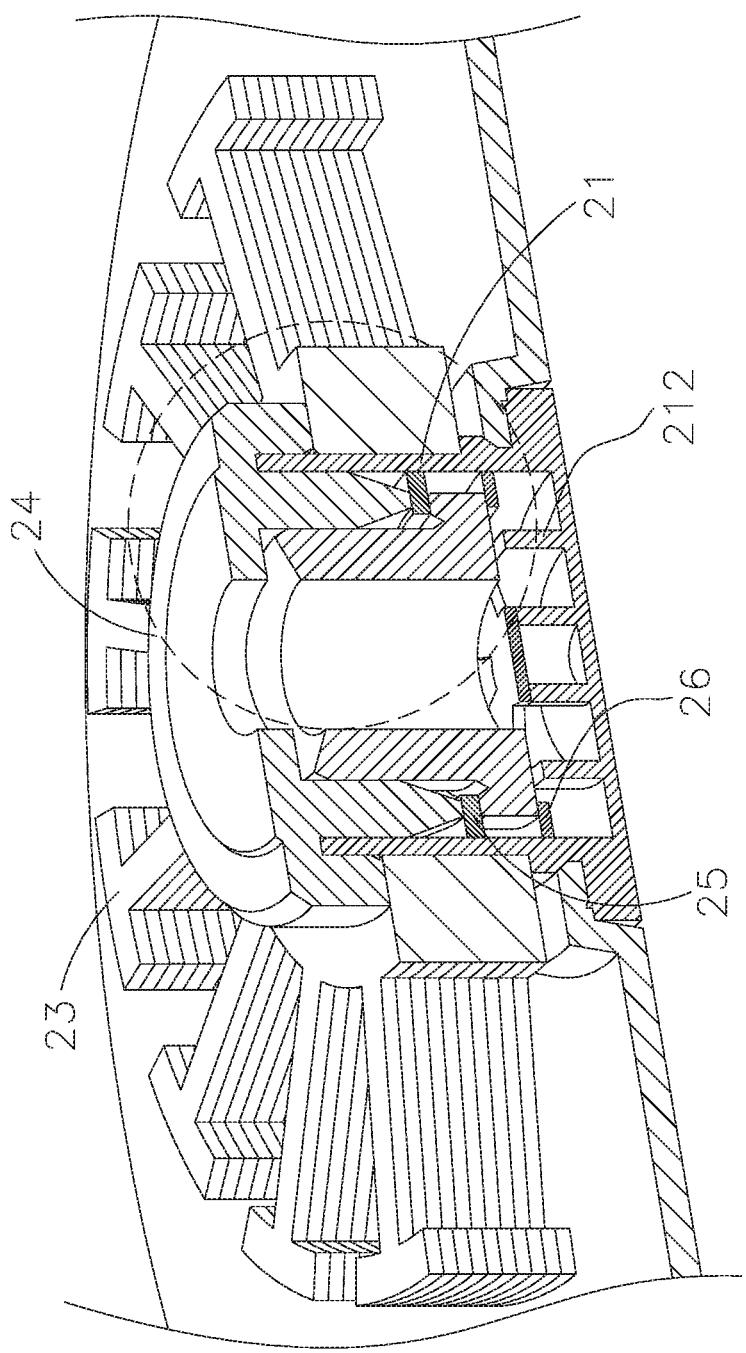
FIG. 2C is a perspective sectional view of the first embodiment of the stator structure of the present invention.
Figure 2D:
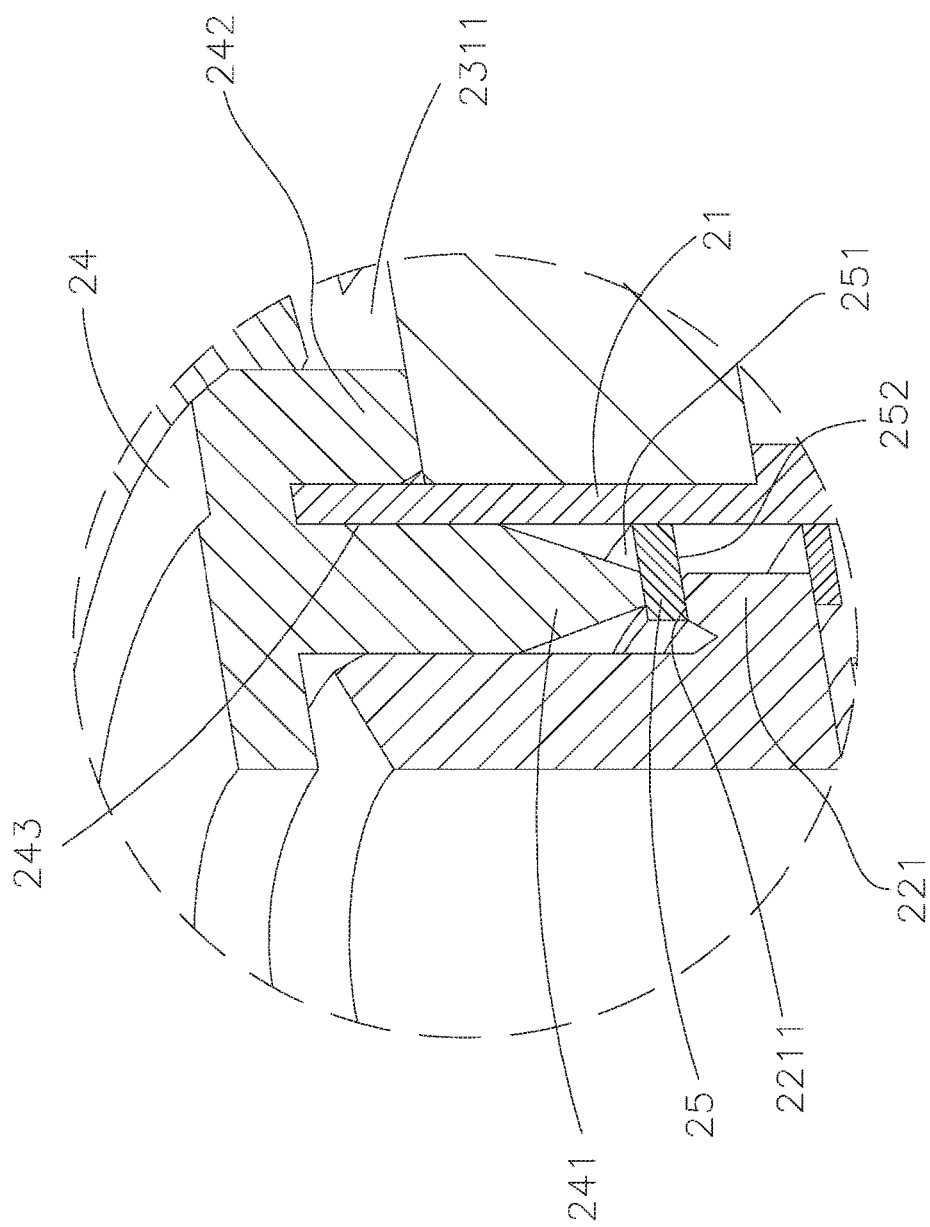
FIG. 2D is an enlarged view of the circled area of FIG. 2C.

Please refer to FIGS. 2A, 2B, 2C and 2D. FIG. 2A is a perspective exploded view of a first embodiment of the stator structure of the present invention. FIG. 2B is a perspective assembled view of the first embodiment of the stator structure of the present invention. FIG. 2C is a perspective sectional view of the first embodiment of the stator structure of the present invention. FIG. 2D is an enlarged view of the circled area of FIG. 2C. According to the first embodiment, the stator structure 2 of the present invention includes a bearing cup 21, a bearing 22, a silicon steel sheet assembly 23 and a press member 24. The bearing cup 21 is disposed on a base seat 20 and has a receiving space 211. The bottom of the bearing cup 21 is formed with a support section 212, which upward extends from the bottom of the bearing cup 21. The bearing 22 is received in the receiving space 211 and disposed on the support section 212. One end of the bearing 22 is formed with an extension section 221 outward extending from the bearing 22, whereby the bearing 22 has a substantially reverse T-shaped configuration. The silicon steel sheet assembly 23 is composed of multiple silicon steel sheets 231. The silicon steel sheet assembly 23 is fitted around the bearing cup 21 and has an upper end face 2311 and a lower end face 2312. The press member 24 has a first press section 241 and a second press section 242 protruding from one face of the press member 24. The first and second press sections 241, 242 define therebetween a recess 243. The top end of the bearing cup 21 is correspondingly engaged in the recess 243. The first press section 241 correspondingly presses the extension section 221 of the bearing 22. The second press section 242 correspondingly presses the upper end face 2311 of the silicon steel sheet assembly 23.

The stator structure 2 further has an elastic member 25 received in the receiving space 211. The elastic member 25 has an upper face 251 and a lower face 252. The first press section 241 correspondingly presses the upper face 251. The extension section 221 of the bearing 22 is further formed with a raised rim 2211 upward protruding from the extension section 221. The raised rim 2211 correspondingly contacts the lower face 252 of the elastic member 25. When the motor operates, the elastic member 25 serves to absorb vibration to achieve a vibration absorption effect.

In addition, in this embodiment, the stator structure 2 further has a wear member 26. The wear member 26 is received in the receiving space 211 and positioned between the support section 212 and the bearing 22. The wear member 26 serves to prevent the bearing 22 from contacting and abrading the bearing cup 21 so as to protect the bearing cup 21 from damage. In this embodiment, the stator structure 2 has the wear member 26 for illustration purposes. In practice, the wear member 26 can be adjusted according to a user's requirement.

According to the structural design of the present invention, when assembling the stator structure 2, the first press section 241 of the press member 24 correspondingly presses the upper face 251 of the elastic member 25, whereby the lower face 252 of the elastic member 25 presses the raised rim 2211 of the bearing 22. The second press section 242 correspondingly presses the upper end face 2311 of the silicon steel sheet assembly 23. In other words, the press member 24 is able to press and secure both the bearing 22 and the silicon steel sheet assembly 23. In this case, when the motor operates, the concentricity of the silicon steel sheet assembly 23 and the bearing 22 can be greatly enhanced. In addition, during the assembling process, the precision of the assembling positions of the silicon steel sheet assembly 23 and the bearing 22 are greatly increased.

Also, the stator structure 2 of the present invention eliminates the problem of the conventional stator structure that the silicon steel sheet assembly and the bearing cup are assembled by means of radial interference so that during the assembling process, the silicon steel sheet assembly and the bearing are apt to deform due to compression. Furthermore, the press member 24 presses the extension section 221 of the bearing 22 so as to secure the bearing 22. That is, the main body of the bearing 22 will not directly bear the axial pressure so that the damage ratio of the bearing 22 is greatly lowered.

In conclusion, in comparison with the conventional stator structure, the present invention has the following advantages:

1. The concentricity of the silicon steel sheet assembly and the bearing is greatly enhanced.
2. The precision of the assembling positions of the silicon steel sheet assembly and the bearing are greatly increased.
3. The stator structure of the present invention eliminates the problem of the conventional stator structure that the silicon steel sheet assembly and the bearing cup are assembled by means of radial interference so that the silicon steel sheet assembly and the bearing are apt to deform.
4. During the assembling process, the bearing is prevented from being deformed.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:
1. A stator structure comprising:
a bearing cup disposed on a base seat, the bearing cup having a receiving space;

a bearing received in the receiving space, a bottom end of the bearing being formed with an extension section outward extending from the bearing;

a silicon steel sheet assembly fitted around the bearing cup, the silicon steel sheet assembly having an upper end face and a lower end face; and a press member correspondingly assembled and disposed on a top end of the bearing cup, the press member having a first press section and a second press section protruding from one face of the press member, the first press section correspondingly pressing the extension section of the bearing, the second press section correspondingly pressing the upper end face of the silicon steel sheet assembly.

2. The stator structure as claimed in claim 1, further comprising an elastic member received in the receiving space, the elastic member having an upper face and a lower face, the first press section correspondingly pressing the upper face, the lower face of the elastic member being correspondingly attached to the extension section of the bearing.

3. The stator structure as claimed in claim 2, wherein the extension section of the bearing is further formed with a raised rim upward protruding from the extension section, the raised rim correspondingly contacting the lower face of the elastic member.

4. The stator structure as claimed in claim 1, wherein the first and second press sections define therebetween a recess, the top end of the bearing cup being correspondingly engaged in the recess.

5. The stator structure as claimed in claim 1, wherein the silicon steel sheet assembly is composed of multiple silicon steel sheets.

6. The stator structure as claimed in claim 1, wherein a bottom of the bearing cup is formed with a support section, which upward extends from the bottom of the bearing cup, the bearing being disposed on the support section.

7. The stator structure as claimed in claim 6, further comprising a wear member received in the receiving space and positioned between the support section and the bearing.

8. The stator structure as claimed in claim 1, wherein the bearing has a reverse T-shaped configuration.

\* \* \* \* \*